United States Patent [19]

Cole

[11] 4,290,824

[45] Sep. 22, 1981

[54] WATER SOLUBLE ROSIN FLUX

[75] Inventor: Hugh F. Cole, Carrollton, Tex.

[73] Assignee: Cobar Resources, Inc., Dallas, Tex.

[21] Appl. No.: 101,474

[22] Filed: Dec. 10, 1979

[51] Int. Cl.³ .............................................. B23K 35/34
[52] U.S. Cl. ........................................ 148/23; 148/25
[58] Field of Search ...................................... 148/23-25

[56] References Cited

U.S. PATENT DOCUMENTS

| | | | |
|---|---|---|---|
| 3,689,327 | 9/1972 | Boyne | 148/23 |
| 3,734,791 | 5/1973 | Poliak | 148/23 |
| 3,746,620 | 7/1973 | Vance | 148/23 |
| 3,791,879 | 2/1974 | Goldfarb | 148/23 |
| 3,895,973 | 7/1975 | Stayner | 148/23 |
| 3,912,550 | 10/1975 | Bolte | 148/23 |

*Primary Examiner*—P. D. Rosenberg
*Attorney, Agent, or Firm*—Warren H. Kintzinger

[57] ABSTRACT

A rosin flux with a water soluble rosin derivative replacing the rosin of otherwise a typical rosin flux such that residues of solder flux be completely removable with either a water based or solvent based cleaning substance.

10 Claims, No Drawings

WATER SOLUBLE ROSIN FLUX

This invention relates in general to soldering fluxes, and in particular to water soluble soldering fluxes with a water soluble rosin derivative such that residues of solder flux are easily removed after soldering with a water wash or by a solvent based cleaning fluid.

In soldering it is important to form a good solder joint with this enhanced by the quality of and characteristics of the soldering flux employed. In the soldering process it is advantageous in many applications for soldering flux to remove surface oxide, decrease surface tension of molten solder, and inhibit formation of surface oxides at elevated temperatures to insure formation of stronger, more secure solder bonds in a reliably predictable uniform fashion. It is necessary that residues of solder flux be completely removed, advantageously, with either a water based or solvent based cleaning fluid, particularly where soldering is used on a circuit board that is to be conformally coated or dipped into any type of protective lacquer since flux residues prevent adhesion of lacquers and other polymer films used to the surface of the circuit card.

Generally, prior art solder fluxes are of two basic types, each with their attendant disadvantages, with the most universally used type being a rosin flux consisting of rosin, a solvent vehicle and activator. Rosins, however, being natural products derived from trees, vary considerably in composition not only from season to season but also from tree source to tree source. Heretofore, while some solder fluxes have been made with processed rosin that has been either hydrogenated or dehydrogenated to improve use characteristics and thermal stability, such treated rosin shares with other rosins the disadvantage they are all water insoluble. Further, most commercially available materials share the common disadvantage of containing unsaponifiable, or difficult to saponify, fractions making them only marginally suitable for cleaning by a water based cleaning process such as rosin saponification. Many well known rosin fluxes typically contain a solvent such as, but not limited to, various alcohol blends, and an activator system consisting of some type of organic acid and/or a halide (i.e. chloride or bromide salt) in a relatively low concentration.

A second family of commercially available soldering fluxes, while designated as being water soluble fluxes, in its various compositions substitutes a synthetic water soluble polymer such as polyglycol in the place of rosin and rosin derivatives. Such a flux system eliminating the use of rosin and/or rosin derivatives completely is described in U.S. Pat. No. 3,436,278 entitled "Glycol Soldering Fluxex". Flux solvent system approaches also include solvent systems such as the alkyl alcohol and relatively high amounts of activators such as organic acids and halide salts. These pre-existing fluxes are, in many instances, very corrosive when not completely removed from a work surface and require relatively high amounts of polyglycol materials to effectively ensure post soldering flux residue wash removal. Use of some of these earlier developed fluxes, depending on specific type used, results in excessive smoking and fuming in the soldering operation and the resulting flux residue becomes extremely difficult to remove by water after extended time exposure to soldering temperatures. Further, it should be noted that polyglycol solvents and glycol resins do not inherently have corrosion and/or oxidation removal properties allowing them to work as independent activating agents in the advantageous manner that rosin does.

Applicant's present contribution involves the use, in newly compounded solder fluxes, of processed rosin derivatives ideally suited to use with water based cleaning post soldering wash systems. Such solder flux mix compounds with processed rosin derivatives in place of polyglycols overcome disadvantages in actively participating in the soldering process to increase the spread rate of solder. In place of being a corrosive agent being an effective corrosion inhibitor at the high temperatures encountered in soldering. The improved solder flux is quite effective even with rosin derivative content at substantially lower concentration levels in achieving effective water soluble solder flux residue wash away than its counterpart content in other flux solvent systems. Further, the new rosin derivatives used are totally water soluble over a broad spectrum of water rinse temperatures.

It is, therefore, a principal object of this invention to provide an improved solder flux with soldering flux residue completely and easily removable with either a water based or solvent based cleaning substance.

Another object is to provide a solder flux advantageously participating in the soldering process and increasing the spread rate of solder during soldering.

A further object of the invention is to minimize and/or eliminate high temperature work surface corrosion during soldering.

Features of the invention useful in accomplishing the above objects include in improved solder fluxes a water soluble rosin derivative in such concentrations as to render solder flux residues easily removable after soldering with a water wash or by a solvent based cleaning fluid.

In deriving the water soluble rosin derivative used in improved solder fluxes it is important that the dehydrogenation of rosin yields a far more thermally stable compound than basic rosin (i.e. pimeric type acids become far more stable dehydropimeric acids. Reaction of ammonia with dehydrogenated rosin yields nitryl, from which specific nitryl dehydropimeric acid is obtained. This in turn is hydrogenated by catalytic hydrogenation at elevated temperatures and pressures to yield dehydroabietylamine. Adducts of dehydroabietylamine and ethylene oxide yield a surface active material with varying degrees of water solubility depending on the mole ratio of ethylene oxide and amine with mole ratios in excess of nine generally required to insure complete solubility of the compound in water over a broad temperature range. A typical example of such a compound is Hercules Polyrad 1110. Thus, rosin can be processed to increase its uniformity and then be reacted with ethylene oxide or other suitable water soluble polymer chain material to make it water soluble, and then easily and in a straight-forward manner incorporated in a soldering flux yielding a soldering flux residue that is totally removable with a water wash.

The following formulations are examples of various solder fluxes compounded to include the benefits of rosin based soldering flux and yet be easily removable with either a water based wash or solvent based cleaning substance.

COMPOSITION I 0.5–1.5% by weight amine hydrochloride salt
5–32% by weight water soluble rosin derivative balance—alkyl alcohols, water or any similar solvent.

In the first composition the water soluble rosin derivative takes the place of rosin in a typical rosin flux. The rosin derivative because of its surface active properties gives greatly improved wetting and can participate in the activation process if it has an active site. The alkyl alcohols referred to are generally isopropyl, methyl or ethyl alcohol, but this is not to exclude such well known solvents as tertiary butyl alcohol, terpine based solvents or any of the chlorinated hydrocarbons employed in the prior art.

COMPOSITION II 1.5–6.0% by weight carboxyilic and/or dehydroxy carboxylic acids
2–32% by weight water soluble rosin derivative
Balance—alkyl alcohol, water or any other similar solvent The second cmposition is a typical halide free flux such as those used in the prior art. The organic acid activator system is carefully controlled to avoid corrosive effects normally associated with halide free fluxes. In addition to providing the normal functions of rosin, the rosin amine derivative will act synergistically in this formulation to increase the wetting speed and the spread rate of the instant composition.

COMPOSITION III

0–5% by weight mineral acid such as hydro chloric acid
0–5% by weight aminehydrohalide salt pl 0–5% by weight organic acid such as carboxylic or dehydrocarboxylic acids
2–32% by weight water soluble rosin derivative
Balance—alkyl alcohols, water or any other similar solvent vehicle In the third composition the activator consists of a combination of strong acids and acid salts such as those found in a typical water soluble flux of the prior art. In this composition the specific water soluble rosin derivative discussed (i.e. the rosin amine) moderates the attack of the acid on the metal substrate without impairing its ability to remove surface oxides. It also enhances wetting of the substrate and acts as a carrier to the activation systems. Substantially all residues from this flux are totally water soluble.

COMPOSITION IV 0.1–4% by weight aliphatic or aromatic brominated activator or similar compound that serves as an activator for a rosin mildly activated flux as defined in Military Std 14256
2–32% by weight water soluble rosin derivative
Balance—alkyl alcohols, water or similar solvent systems In the fourth composition the water soluble rosin derivative takes the place of rosin in a standard rosin mildly activated flux. These are fluxes generally used for touch up soldering or for soldering in which the user does not intend removal. This flux is included by way of illustration that these types are not excluded from consideration under the present invention.

While the preceding formulations are various examples of liquid, or semiliquid, fluxes used in automated soldering applications there are many additional applications in accord with appliant's teachings, such as applications thereof to flux in flux cored wires, solder flux cored or coated preforms and paste solders. In such systems solvents, diluents, thickners and the resin derivative compatible with water removal are added in accord herewith as required to perform a specific applicaton. It is to be understood that liquid flux compositions can be manufactured as concentrates for ease of shipment for dilution to a specific concentration by the end user. Concentration of fluxes is a practice well known to individuals skilled in the art, and the manufacture or use of said concentrates is hereby included in the scope and spirit of this invention.

Four specific formula examples are presented hereafter not by way of limitation but to illustrate applicant's contribution in several specific forms.

| Example 1 | % by Weight |
|---|---|
| Citric acid | 5 |
| 11 mole ethylene oxide adduct of dehydroabietylamine | 25 |
| Isopropyl alcohol | 70 |
| Example 2 | |
| Dimethylamine hydrochloride | 1 |
| 11 mole ethylene oxide adduct of dehydroabietylamine | 20 |
| Isopropyl alcohol | 54 |
| Butyl cellosolve | 15 |
| Distilled water | 10 |
| Example 3 | |
| Hydrochloric acid | 2 |
| 11 mole ethylene oxide adduct of dehydroabietylamine | 15 |
| Methyl alcohol | 73 |
| Butyl cellosolve | 5 |
| Distilled water | 5 |
| Example 4 | |
| Dimethylamine hydrochloride | 3 |
| 11 mole ethylene oxide adduct of dehydroabietylamine | 50 |
| 5 mole ethylene oxide adduct of dehydroabietylamine | 20 |
| Butyl cellosolve | 5 |
| Isopropyl alcohol | 22 |

Whereas, this invention is herein described with respect to a preferred embodiment, it should be realized that various changes may be made without departing from essential contributions to the art made by the teachings hereof.

I claim:

1. A flux composition comprising: an activator in mix composition with a water soluble rosin derivative, proportioned by weight, respectively, one to a proportion in the approximate range of one-half to eighty, and a suitable diluent vehicle.

2. The flux composition of claim 1, wherein said activator is in the approximate range of from 0.2 to 20% by weight; water soluble rosin derivative in the approximate range from 1.5 to 32% by weight; and with said diluent vehicle being a diluent media from the group normal propyl alcohol, isopropyl alcohol, ethyl alcohol, methyl alcohol, tertiary butyl alcohol, alkyl alcohols, glycol ethers, acetates, chlorinated hydrocarbons, fluorinated hydrocarbons, water and any mixtures thereof.

3. The flux composition of claim 2, wherein said water soluble rosin is a multi-mole adduct of at least the 5 mole level.

4. The flux composition of claim 3, wherein said multi-mole adduct is the ethylene oxide adduct of dehydroabietylamine.

5. The flux composition of claim 4, wherein said multi-mode adduct is 11 mole ethylene oxide adduct of dehydroabietylamine.

6. The flux composition of claim 2, wherein said activator is from the group dimethylamine hydrochloride, citric acid, adipic acid, benzoic acid, lactic acid, hydrochloric acid and hydrobromic acid, and organic salts derived from hydrochloric and hydrobromic acids.

7. The flux composition of claim 1, wherein said activator is a compound used in a mildly activated rosin flux.

8. The flux composition of claim 1, wherein said water soluble rosin is a multi-mold adduct of at least the 5 mole level.

9. The flux composition of claim 8, wherein said multi-mole adduct is the ethylene oxide adduct of dehydroabietylamine.

10. The flux composition of claim 9, wherein said multi-mole adduct is 11 mole ethylene oxide adduct of dehydroabietylamine.

* * * * *